April 30, 1940.  T. B. CHACE  2,199,150

METHOD OF MAKING COMPOSITE METAL PIPE

Filed May 5, 1937

Inventor:
Thomas B. Chace

Patented Apr. 30, 1940

2,199,150

UNITED STATES PATENT OFFICE 2,199,150

METHOD OF MAKING COMPOSITE METAL PIPE

Thomas B. Chace, Winnetka, Ill., assignor to Clad Metals Industries, Inc., Chicago, Ill., a corporation of Illinois Application May 5, 1937, Serial No. 141,000

1 Claim. (Cl. 29—188)

My invention relates, generally, to longitudinal seam welded pipe and methods for making the same, and it has particular relation to the making of such pipe from a composite skelp having a corrosion resisting facing and a steel backing.

It is well known to make pipe from long strips of metal or skelp by forming the same into tubular shapes to make pipe blanks having seam clefts. The seam cleft is welded either by the electrical resistance method, or the flash welding method, or the arc welding method. Little difficulty is encountered in the fabrication of such pipe by these methods when the pipe blank is homogeneous in character, i. e. composed of the same metal throughout.

In the production of pipe formed of a backing metal provided with a facing or cladding metal having non-corrosive properties, many physical factors must be considered and special attention paid to them in order to produce a satisfactory product. For example, the melting and vaporization temperatures, coefficients of expansion, and the thermal conductivities of the backing and facing or cladding metals must be considered. Also, the affinity of the facing or cladding metal for oxygen at various temperatures, the relative solubility of oxides in it, the vaporization of these metal oxides, and the relative fluidity or viscosity of the facing or cladding metal, are important factors.

It is essential that the relation between the backing and cladding or facing metals be such that the non-corrosive characteristics of the cladding or facing metal will be retained in the finished product and, at the same time, little or no change is caused in the character of the backing metal as a result of the seam welding process.

In view of the foregoing it is an object of my invention to make a composite skelp for formation into pipe adapted to be longitudinally seam welded in such manner that the longitudinal seam welding process does not expose or substantially fuse the backing metal.

Another object of my invention is to extend the corrosion resisting inner surface of a composite pipe blank adapted for longitudinal seam welding to the outer surface of the blank, so that the juxtaposed edges of the seams will be formed by the corrosion resisting metal.

Still another object of my invention is to provide sufficient thickness of corrosion resisting metal along the juxtaposed surfaces of a seam cleft in a pipe blank adapted to be longitudinally seam welded as will permit fusion welding of the same without substantially fusing the backing metal of the blank.

A further object of my invention is to provide a composite skelp suitable for formation into a pipe blank adapted to be electrically longitudinally seam welded, in which the facing or cladding metal and the backing metal have approximately the same electrical and mechanical characteristics.

Other objects of my invention will, in part, be obvious and in part appear hereinafter.

Accordingly, my invention is disclosed in the embodiment hereof shown in the accompanying drawing, and it comprises the features of construction, combination of elements, arrangement of parts, and methods of fabrication as will be exemplified hereinafter and the scope of the application of which will be indicated in the appended claims.

For a more complete understanding of the nature and scope of my invention, reference may be had to the following detailed description, taken in connection with the accompanying drawing, in which.

Figure 1:
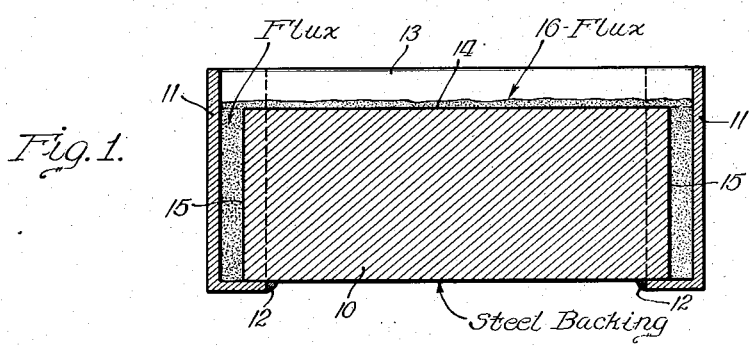
Figure 1 is a transverse sectional view of the steel backing slab with the mould members or strips in position for receiivng the cladding or facing metal.
Figure 2:
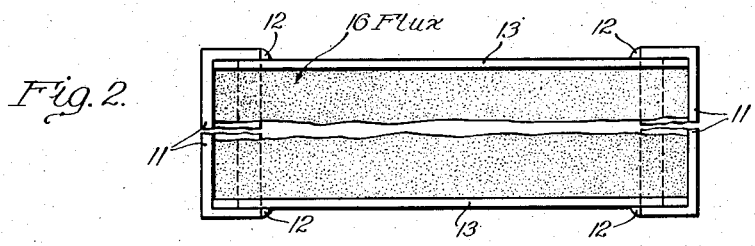
Figure 2 is a top plan view of the mould and backing slab shown in Figure 1.

Referring now more particularly to Figures 1 and 2 of the drawing, it will be observed that the reference character 10 designates a backing slab that may be formed of steel that is suitable for use in pipe fabrication. To the opposite ends of the slab 10 suitably shaped mould members 11 are welded, as indicated at 12. Side mould members 13 are welded along the upper surface 14 of the slab 10 along opposite edges and at the ends to the end mould members 11. The mould members 11 and 13 are preferably formed of steel strip material that may be reaily fabricated to the desired shapes and sizes and which may be readily rolled in the subsequent rolling operation.

It will be observed that the mould members 11 and 13, with the top surface 14 and end surfaces 15 of the slab 10, form mould spaces for receiving cladding or facing metal, as will be presently set forth. These surfaces are thoroughly cleaned, as by sand blasting, and then the mould spaces are filled with a suitable flux, such as a mixture of boric acid and borax, as indicated at 16, and then the slab 10, with the flux in place, is preheated to a welding temperature.

Figure 3:
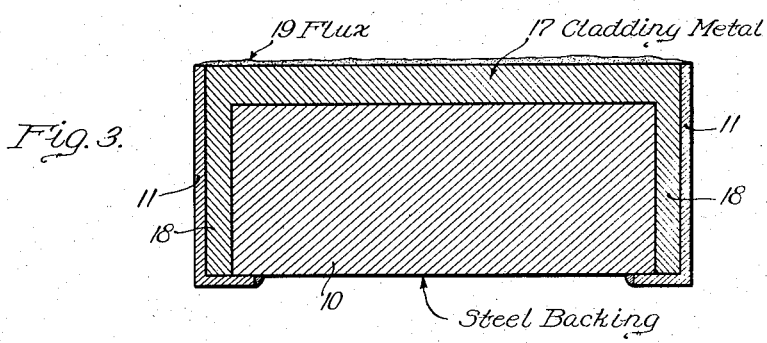
Figure 3 is a transverse sectional view of the composite slab with the cladding or facing metal cast in the mould spaces about the steel backing slab.

When the slab 10 has been preheated as desired, the mould spaces are filled with a suitable cladding metal, as shown at 17 and 18 in Figure 3 of the drawing. As shown at 19, the flux that was originally in the spaces now filled with cladding metal has floated to the surface and can be removed by any suitable means. It will be understood that the dimensions of the mould spaces formed by the mould members 11 and 13 with the surfaces 14 and 15 of the backing slab 10 may be varied as desired, in accordance with the proportions of cladding or facing and backing metal that it is desired to have in the resulting composite skelp or strip.

A more detailed description of the construction of the mould, the different types of suitable fluxes and methods of casting the cladding or facing metal, may be had by reference to my copending applications, Serial No. 6,497, filed February 14, 1935, now Patent No. 2,145,248, and Serial No. 64,280, filed February 17, 1936. For the purposes of the present invention it is necessary to describe herein only the desired composition of the cladding or facing metal, together with the manner in which it is cast about three sides of the backing slab 10, the method of rolling and trimming the resulting composite skelp or strip, forming the composite skelp into a pipe blank, and fusion welding the same to form the pipe.

Figure 4:
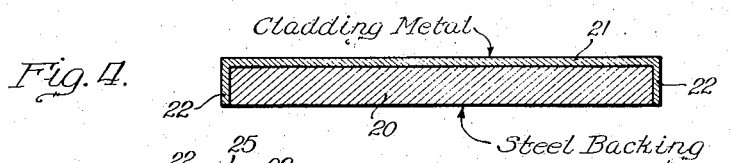
Figure 4 is a transverse sectional view of the rolled skelp or strip that is suitable for formation into a pipe blank having a longitudinal seam cleft.

After the composite slab is formed, as shown in Figure 3, it is hot rolled in such manner as to increase its length and decrease its thickness without substantially increasing its width. The mould members 11 and 13 are rolled with the composite slab and may be trimmed therefrom to provide the skelp or strip as shown in Figure 4. The composite skelp resulting from the rolling and trimming operations comprises the steel backing portion 20 having the top and sides covered with an integrally bonded facing or cladding metal as shown at 21 and 22.

Figure 5:
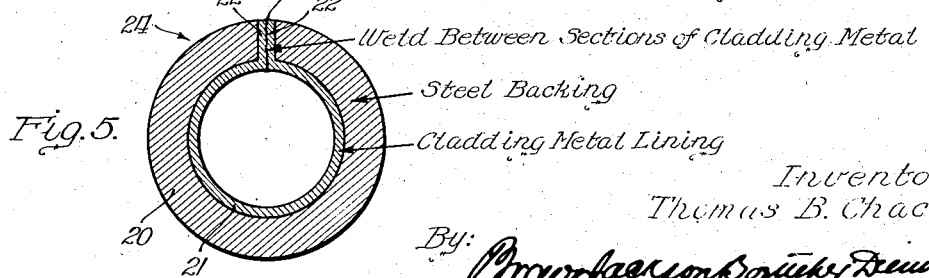
Figure 5 is a transverse sectional view of a composite pipe having the inner surface formed by a non-corrosive metal.

It is important that the sides or edges of the backing portion be provided with the facing or cladding metal 22 so that, as shown in Figure 5 of the drawing, the juxtaposed surfaces of the seam cleft in the pipe blank, shown generally at 24, will be formed by the facing or cladding metal rather than by the backing metal 20. The longitudinal seam cleft 25 between the juxtaposed surfaces of the clad metal portion 22 may be welded by any suitable welding process, such as the resistance welding, flash welding, or arc welding process, although the resistance welding process is preferred. Since the welding takes place between adjacent portions of the cladding or facing metal, there is no likelihood of the backing metal being exposed, particularly along the longitudinal seam cleft.

In order to provide non-corrosive properties in the cladding or facing metal I prefer to form this metal 17—18, Figure 3, or 21—22, Figure 5, of cuprous metal and the preferred metal is a silicon bronze which contains sufficient silicon to substantially decrease its electrical conductivity, which makes it readily applicable for resistance welding. It will be understood, however, that the invention is not limited to this particular metal but that other non-corroding metals, such as nickel or high nickel-copper alloys, or stainless steel, may be employed to practice the present invention.

The use of silicon copper is also desirable for the reason that this metal will cast in the open type of mould shown in Figure 1, and will solidify with a smooth surface that is well suited for rolling. Also, since it has a suitable viscosity or fluidity it readily fills the mould spaces and integrally bonds itself to the top and end surfaces 14 and 15 of the slab 10. The preferred silicon content ranges from .03% to 4.50%, so that the compression resistance of the cladding metal will compare with the particular backing steel that is used, so that the two metals will elongate uniformly in rolling.

Copper or high conductivity copper alloys are extremely difficult to weld by the resistance welding method and this is particularly true when these metals are used to provide a corrosion resisting facing on steel skelp, for the reason that the steel backing will have a much higher resistance than will the copper or the copper alloy and, hence, will fuse before the copper or copper alloy fuses. This difference in fusion of the two metals is due to the fact that the heat developed along the seam cleft is a function of the resistance of the current path times the square of the current flowing. Thus a small amount of heat is developed with a given current flow when copper or high conductivity copper alloy is employed, since its resistance is low. Furthermore, the conduction of heat away from the weld is very rapid and it is difficult to make the weld, particularly when it is attempted to longitudinally seam weld a composite pipe blank. By the use of silicon as an alloying element in the copper of my facing or cladding metal, it is possible to greatly increase its resistance.

As little as 0.25% silicon in copper decreases its electrical conductivity to about 37% of pure copper, while 4% silicon decreases the conductivity to about 5% of that of pure copper.

Besides being a useful alloying element for the purpose of increasing the resistance of the cladding or facing metal, silicon is a powerful deoxidizer. This facilitates the production of a smooth and easily rollable surface and facilitates the fusion seam welding.

Silicon oxide reacts instantly at the fusion temperature of copper with the oxides of copper to form an amorphous glass which melts at a temperature nearly coincident with that of copper or copper alloys. This reaction takes place at the surface of the molten pool, the silicon oxide and the resulting glass having a relatively low specific density of about 2.75%. The film of molten glass spreads uniformly over the pool of metal and completely covers the same. Such action is obtained even if the silicon is as low as 0.03%. The flux-like film of glass protects the molten metal from oxidation. Silicon does not vaporize, as it has a boiling point of 4700° F. Furthermore, its oxides do not vaporize and, therefore, it is very useful as an alloying element in the highly heated copper in welding as well as in the bonding to the steel backing.

To a certain extent silicon in copper makes it difficult to bond the resulting alloy to steel in such manner that it is suitable for rolling. In order to better the bonding I add, with the silicon, nickel, and to generally improve the alloy, such elements as manganese, tin, or zinc, or to form silicides to strengthen the alloy or to make it susceptible to heat treatment, such elements as iron, chromium, cobalt, or aluminum may be added.

The skelp may be welded together at the edges by any of the well known methods for creating welding temperatures of the meeting edges. Alternatively the edges may be brought into close proximity, not quite in contact, and brought to welding temperature by the atomic hydrogen flame and then forced together to produce the weld.

While I have shown a thick walled pipe (Figure 5) this is for clarity of illustration and is not intended to be limiting. Any desired ratio of wall thickness to diameter may be employed. Likewise, the thickness ratio of cladding may be varied. From 5% to 20% thickness of the cladding will be found to cover general requirements. Also, the illustration of the thickness of the cladding at the sides in proportion to the other dimensions of the composite slab is illustrative, and not limiting. The slab, in being rolled to the finished skelp, may be edge rolled if desired.

It is to be observed that I have employed the term "flux" to designate the blanket 16—19 of corrosion or oxidation preventing material. This material might be termed a slag blanket, as it functions like a covering of slag to exclude atmosphere during both preheating of the mould and permitting the pouring of the molten cuprous or other metal through and under it into contact with the cooperating faces of the block or slab 10.

While silicon is the preferred alloying element, I do not intend to limit the composition of the cladding metal to silicon copper. In place of the silicon I may use such elements as phosphorus or magnesium as the oxidizers or desulphurizers, or to lower the thermal conductivity.

It will be obvious that it is decidedly advantageous to form the composite metal pipe from the composite skelp as herein disclosed, rather than to make it in the form of seamless tubing. Before the skelp or strip is formed into the tubular pipe blank it may be thoroughly inspected with a view to finding any defects or flaws that may be present in the cladding or facing metal.

Since certain changes may be made in the foregoing construction and slightly different steps may be employed in producing the composite pipe without departing from the scope of the present invention, it is intended that all matter shown in the accompanying drawing or described hereinbefore shall be interpreted as illustrative, and not in a limiting sense.

I claim as my invention:

Method of making a metal skelp clad on the top and sides with any desired uniform thickness of cladding metal, which comprises: welding metal mould members to a metal backing slab in such a manner as to form mould spaces with its top and side surfaces, sealing the top and side surfaces of the slab to exclude air, preheating the slab to welding temperature, filling the mould spaces with a cladding metal, rolling the resulting composite slab in such manner as to increase its length without substantially increasing its width, and trimming the metal originally forming the mould members from the sides of the resulting composite skelp.

THOMAS B. CHACE.